Sept. 3, 1940.                F. RICHTER                    2,213,869
                        CIGAR BUNCH HEAD TRIMMER
                         Filed May 21, 1936
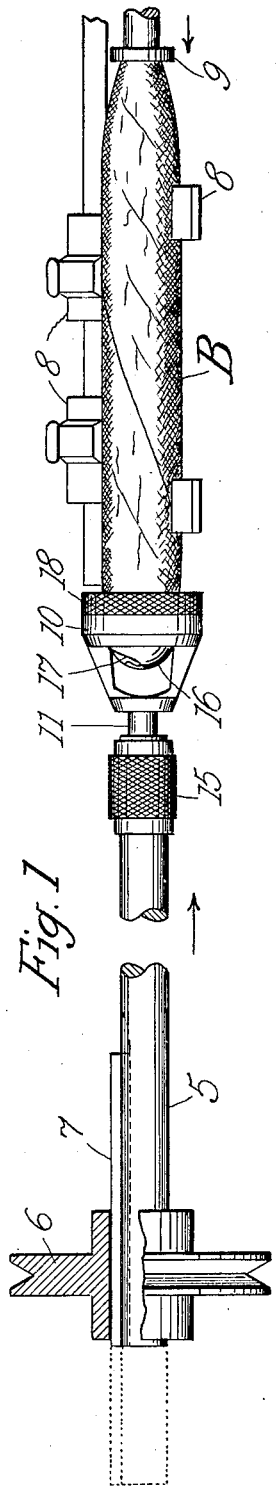
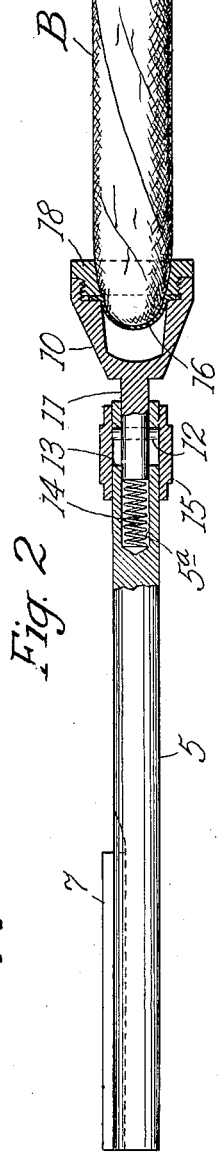
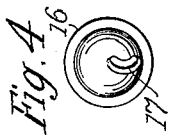
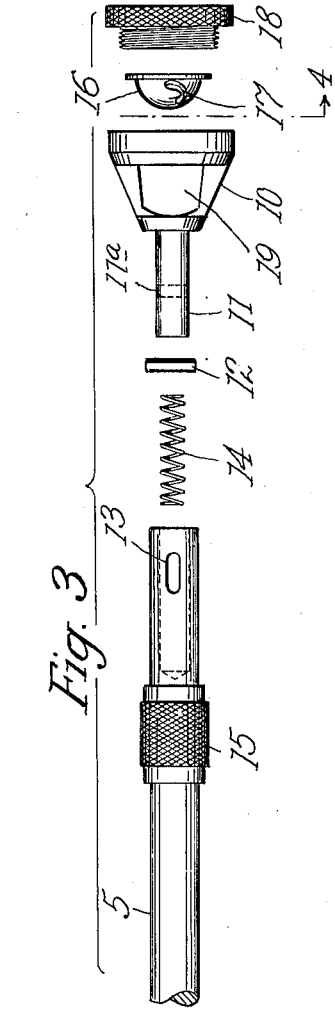
INVENTOR
Franz Richter
BY George G. Hastings
ATTORNEY Patented Sept. 3, 1940

2,213,869

UNITED STATES PATENT OFFICE 2,213,869

CIGAR BUNCH HEAD TRIMMER

Franz Richter, Dobeln, Germany, assignor to International Cigar Machinery Company, a corporation of New Jersey Application May 21, 1936, Serial No. 80,989

4 Claims. (Cl. 131—91)

This invention relates to an improvement in cigar bunch head trimming devices, its main object being to provide a simple and more efficient mechanism for removing the surplus material from the heads of partially formed cigar bunches to give the bunch heads final form.

Trimmers for this purpose heretofore in commercial use have generally consisted of an integral head shaped unit or thimble of conical cup shape having therein an opening cut into the thimble wall and extending to the portion thereof engaging the extreme tip of the bunch so that a shearing edge flush with the inner wall of the thimble is formed. A device of this general type is shown in United States Patent 1,964,052, issued June 26, 1934, to John F. Halstead.

While trimmers of the type mentioned above have proven statisfactory, it has been found, nevertheless, that after continued use the cutting edge becomes worn and dull, thereby necessitating removal from the machine and replacement of the entire trimmer unit at a relatively high cost.

In my improved structure the trimming operation is performed by an operating member which consists of a stamped or otherwise suitably formed element or thimble having a cutting edge opening therein, which element is detachably secured in a holder portion by a threaded ring or other suitable means. Therefore, by the use of my improved trimmer mechanism it is no longer necessary to discard the whole unit, as in the prior art; it is only necessary to substitute for the worn element a new cutting element, procurable at a low cost. Also, it is an easy matter to substitute a differently shaped trimming element in order to operate on various types of cigar bunch heads.

The principal object of this invention is, therefore, to provide a trimmer which is made of several easily separable parts and is inexpensive to operate; the part constituting the trimmer element which becomes dull and worn being readily replaceable at low cost.

A further object is to provide simple means for driving, and detaching the trimmer unit from said driving means, and also, means whereby the several parts of the trimmer unit may be quickly detached from each other. With these and other objects not specifically mentioned in view, the invention consists in certain constructions and combinations which will be hereinafter fully described and then specifically set forth in the claims hereunto appended.

In the accompanying drawing which forms a part of this specification and in which like characters of reference indicate the same or like parts:

Fig. 1 is a side elevation of the improved cigar bunch trimmer showing the manner of its operation;

Fig. 2 is a sectional side elevation of the same, showing the arrangement of its component parts;

Fig. 3 is an exploded view showing the parts separately;

Fig. 4 is a plan view of the trimming element; and

Fig. 5 is a plan view of a modified form of trimming element.

In practicing this invention there is provided holding means for delivering a cigar bunch having a partially completed head into trimming position, a trimmer unit having a quickly detachable trimming element or thimble, said element having formed therein an edged cutting opening by means of which tobacco removed from the head of the bunch may escape, and means for causing relative movement between a cigar bunch supported by the holder and contacting with the edge of the cutting opening to circumferentially shear excess tobacco from the head of the bunch and shape it to its final form. In the best constructions, the cutting element is stamped from a disk and has its cutting opening formed therein flush with the inside surface so that the shearing action is held within predetermined limits, that is, the cutting edge becomes ineffective when the bunch head has been brought to final size.

The best constructions also include a driving member, means resiliently mounting the trimmer unit on said member and comprising a spring inserted into a bore in the driving member, a pin insertable into a slot in the driving member and through an opening in the shank of the trimmer unit and a sleeve riding on the driving member to hold these parts in assembly; and a stop member arranged to move and press against the tuck end of a cigar bunch during the trimming operation. These various means and parts may be widely varied in construction within the scope of the claims for the particular embodiment selected to illustrate the invention is but one of many possible concrete arrangements of the same. The invention, therefore, is not to be restricted to the specific construction shown and described.

Referring to the drawing, the improved cigar bunch trimmer is mounted in the end of a horizontally reciprocating shaft 5 driven by a fixed pulley 6 in the hub of which slides a key 7 affixed to shaft 5. The latter is carried by a slide suitably mounted in the frame of a bunch finishing machine, similar to the type shown in the Halstead patent above mentioned and actuated by a cam (not shown), so as to advance the trimmer into yielding contact with the head end of a cigar bunch B in the direction of the arrow, when a bunch has been delivered by a holder 8 into trimming position. During the trimming operation, the bunch B is held in position against the pressure of the trimmer by a reciprocating stop 9 slidably carried in the frame of the machine and movable in the direction of the arrow against the tuck end of the cigar.

The improved bunch trimmer consists of a holder 10 having at one end a shank 11 provided with an opening 11a for the reception of a pin 12 for securing the shank in hollow end 5a of shaft 5. By means of a slot 13 in the hollow end of shaft 5 and pin 12 projected through the slot and shank of the holder inserted in bore 5a against a coil spring 14, the holder is maintained in yielding operative position. Sleeve 15 riding on shaft 5 holds the pin in proper position.

The trimming element or thimble is formed preferably by stamping a thin, flat, metallic disk into the desired shape. It is also apparent that this element may be made in other ways. Referring to Fig. 4, it will be observed that the trimming element 16 has a circular flange about its open end, and has cut in, stamped out of or otherwise formed in its curved surface, an opening 17 having a cutting edge on the interior portion thereof. The cutting edge preferably is flush with the inner surface of the element so as to limit the amount of excess tobacco removed from the head of a partially finished cigar bunch in bringing it to proper shape. The opening also allows waste tobacco to escape from the holder through openings 19, during the trimming operation.

In the preferred embodiment, the opening 17 in the trimming element is arcuate or spiral in shape and extends from a point at or near the apex of the curved portion down the side, as shown in Figs. 3 and 4. In the modified form of trimming thimble shown in Fig. 5 there are provided two arcuate or spiral openings 17a. It is obvious though that the shape of the slot is not a controlling factor as it may assume many configurations. I do not wish, therefore, to be limited to any particular shape. The location of the cutting edge will vary with the bunch being worked, dependent upon whether it is a left or right handed bunch. Trimmer holder 10 is provided with a bore into which projects the thimble portion of element 16, and on its open end with an annular abutment against which the flange of the trimmer element 16 fits. It also has a threaded portion adjacent the abutment in which fits a threaded flanged ring 18 for securing trimmer element 16 in operative position in holder 10. Parts of the holder adjacent its drive supporting means are cut away to form openings 19 which allow cut off, excess tobacco to fall away.

What is claimed is:

1. In a device for operating upon the heads of partially finished cigar bunches, a rotatable support, a trimmer unit carried by said support, comprising a holder having an annular abutment, a flanged trimming thimble formed of stamped sheet metal and positioned therein, having a spiral cutting opening formed in its surface, and means for securing said element in operative position in said holder, said means comprising a threaded flanged ring cooperating with said holder for pressing the flange of the thimble against said abutment.

2. In a device for operating upon the heads of partially finished cigar bunches, a rotatable support, a trimming unit carried by said support, comprising a holder having a threaded portion, a trimming thimble having an annular rim positioned in said holder and provided with cutting edges formed in its surface, and means for securing said thimble in operative position in said holder, said means including an annular threaded member cooperating with said threaded holder portion and bearing against said thimble rim.

3. In a cigar bunch head trimming device, a holder element formed with a concavity adapted to receive a bunch end, and terminating in a ring-like interiorly threaded mouth having a shoulder of suitable breadth to constitute an abutment; a separately formed trimming element made of stamped sheet metal having a wall-portion provided with a slot having an integral cutting edge conforming to the desired contour of the bunch head, the material of said trimming element having a circumferential annular lip or flange surrounding its mouth; and an exteriorly threaded annular bushing screwed into said threaded mouth against said shoulder of the holder element with said lip or flange of the trimmer element embraced firmly therebetween, the central orifice or bore of said bushing having its annular inner wall formed to fit the curve of the bunch to afford complemental support to the bunch head.

4. In a cigar bunch head trimming device, a holder element formed with a concavity adapted to receive a bunch end, and terminating in a ring-like interiorly threaded mouth having a shoulder of suitable breadth to constitute an abutment, a separately formed trimming element made of stamped sheet metal having a wall portion provided with a slot having an integral cutting edge, said wall portion conforming to the desired contour of the bunch head, the material of said trimming element having a circumferential annular lip or flange surrounding its mouth, and an exteriorly threaded annular bushing screwed into said threaded mouth against said shoulder of the holder element with said lip or flange of the trimmer element embraced firmly therebetween, the inner wall surface of said concavity having a diameter corresponding to the diameter of the external surface of said trimming element at the base of said lip or flange, the contour of the outer cutting wall surface of the trimming element having a curvature of such degree and so cooperating with said concavity that the longitudinal movement of the bushing into position within the holder element concavity will effect centering of the trimming element relative to the concavity.

FRANZ RICHTER.